United States Patent [19]

Tokunaga

[11] 3,993,297
[45] Nov. 23, 1976

[54] WORK-HOLDING APPARATUS

[75] Inventor: Yoshio Tokunaga, Musashino, Japan

[73] Assignee: Citizen Watch Co., Ltd., Tokyo, Japan

[22] Filed: Oct. 2, 1975

[21] Appl. No.: 618,759

[30] Foreign Application Priority Data
Oct. 7, 1974 Japan .................... 49-120362[U]
Apr. 10, 1975 Japan ...................... 50-47625[U]

[52] U.S. Cl. ............................... 269/54.5; 269/71; 269/133; 269/165
[51] Int. Cl.² ......................................... B23Q 1/00
[58] Field of Search ........... 269/133, 71, 54.4, 54.5, 269/165

[56] References Cited
UNITED STATES PATENTS

| | | |
|---|---|---|
| 636,824 | 11/1899 | Markey .............................. 269/54.4 |
| 845,263 | 2/1907 | Reller .............................. 269/54.4 |
| 1,999,809 | 4/1935 | Gloekler .......................... 269/54.5 |

Primary Examiner—James L. Jones, Jr.
Assistant Examiner—Robert C. Watson
Attorney, Agent, or Firm—Spensley, Horn, Lubitz

[57] ABSTRACT

A work-holding apparatus comprising a support member, a first member rotatably coupled at one end to said support member, a second member rotatably coupled to the other end of said first member, a work piece holding member, and a plurality of restoring means. A restoring means is interposed between each of said members such that when said work-holding apparatus is displaced from some predetermined position by an external force, the apparatus returns to the same predetermined position upon removal of said force.

6 Claims, 9 Drawing Figures

WORK-HOLDING APPARATUS

BACKGROUND OF THE INVENTION

1. Field of the Invention

This invention relates to workpiece holding apparatus and, more particularly, to an apparatus for holding a workpiece placed on a movable jig plate.

2. Description of the Prior Art

It is frequently necessary when mass producing a product to utilize automatic machinery to perform the work upon the item being manufactured. As part of such automatic machinery, it is frequently necessary to supply a means for holding the workpiece down while it is being moved about and having one or more production steps performed on it. Furthermore, since each workpiece is placed onto the automatic machine at the same initial place, the means for holding the workpiece down must also be capable of returning to that same initial starting point.

There exists in the prior art several means for holding the workpiece down and which return to the initial starting point. These means are usually operated by hydraulics, pneumatics, or electric motors. Since such holding means contain no memory in the structure itself, some other memory means must be provided in order to be able to return to the initial start position. Such memory means are usually complex and require such devices as cams, switches and in some cases a rudimentary tape-controlled computer.

SUMMARY OF THE INVENTION

In keeping with the principles of the present invention, the objects are accomplished with the unique combination of a support member, a first member rotatably coupled at one end to said support member, a second member rotatably coupled at one end to the other end of the first member, and a workpiece holding member coupled to the other end of the second member, and a plurality of position restoring means. A restoring means is interposed between each of said members where said members are coupled together. Initially, the restoring means together with the other members are adjusted such that the workpiece holding member is held at some predetermined initial position. When the holding member is displaced from the predetermined initial position by an external force, the holding member is returned by the position restoring means to the same predetermined initial position upon removal of the force.

Accordingly, it is a general object of the present invention to provide a work holding apparatus which automatically returns to the initial position after the operations of the workpiece have been completed.

It is another object of the present invention to provide a simplified work-holding apparatus.

It is yet another object of the present invention to provide a work-holding apparatus which can easily follow the movement of the workpiece.

It is still another object of the present invention to provide a work-holding apparatus which is highly reliable.

BRIEF DESCRIPTION OF THE DRAWINGS

The above-mentioned and other features and objects of the present invention will become more apparent by reference to the following description taken in conjunction with the accompanying drawings, wherein like reference numerals denote like elements, and in which.

DESCRIPTION OF THE PREFERRED EMBODIMENTS

Figures 1, 2:
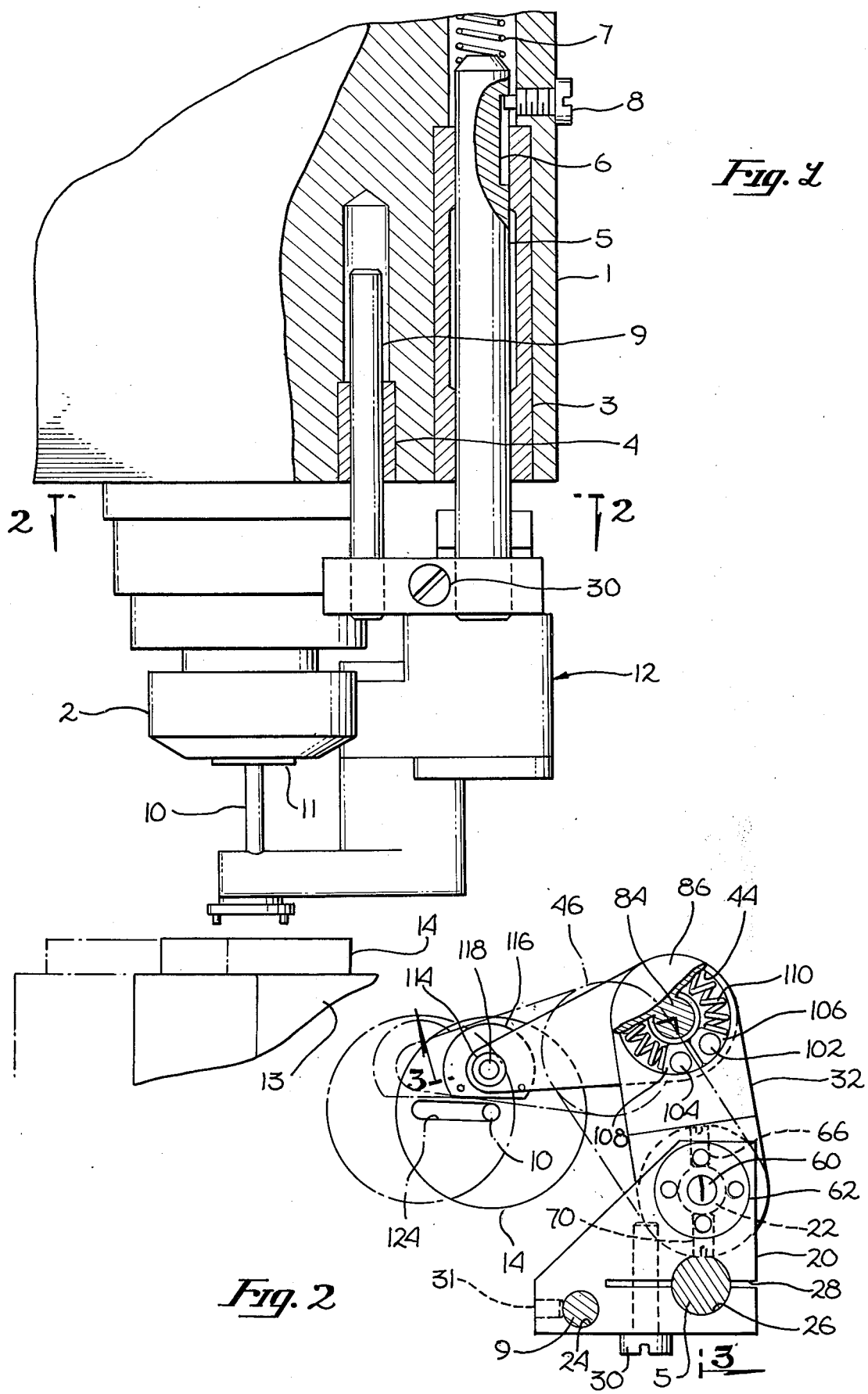
FIG. 1 is a side view of one embodiment of a work-holding apparatus in accordance with the teachings of the present invention.
FIG. 2 is a plan view of the embodiment of FIG. 1 looking in the direction of the 2—2 line.

Referring more specifically to the drawings, FIG. 1 is a side view of one embodiment of a work-holding apparatus in accordance with the teachings of the present invention. FIG. 1 is included to show the basic structure of one embodiment and includes a spindle head 1 having a spindle 2 mounted thereon and rotated by a power source (not shown). Spindle head 1 is fitted with hollow bushings 3 and 4. Article holding shaft 5 having a key way 6 is slidably inserted into bushing 3. Spring 7 within spindle head 1 normally biases holding shaft 5 downwards. Screw 8 in spindle head 1 engages with key way 6 thereby controlling the lowest position of holding shaft 5. Guide shaft 9 is slidably inserted into bushing 4. Spindle 2, holding shaft 5 and guide shaft 9 are vertically directed and in parallel with one another. Cutter 10 is fixed to the lower end of spindle 2 by means such as collate chuck 11. Work-holding apparatus 12 is coupled to the lower projecting end of holding shaft 5 and guide shaft 9. Jig plate 13 capable of reciprocating as indicated by the arrow between a predetermined position indicated by the solid line and another position indicated by the dotted line is mounted beneath cutter 10. Workpiece 14 is successively supplied to and fixed on jig plate 13. After completion of the operations on workpiece 14, it is removed from jig plate 13 by an apparatus (not shown).

Figure 3:
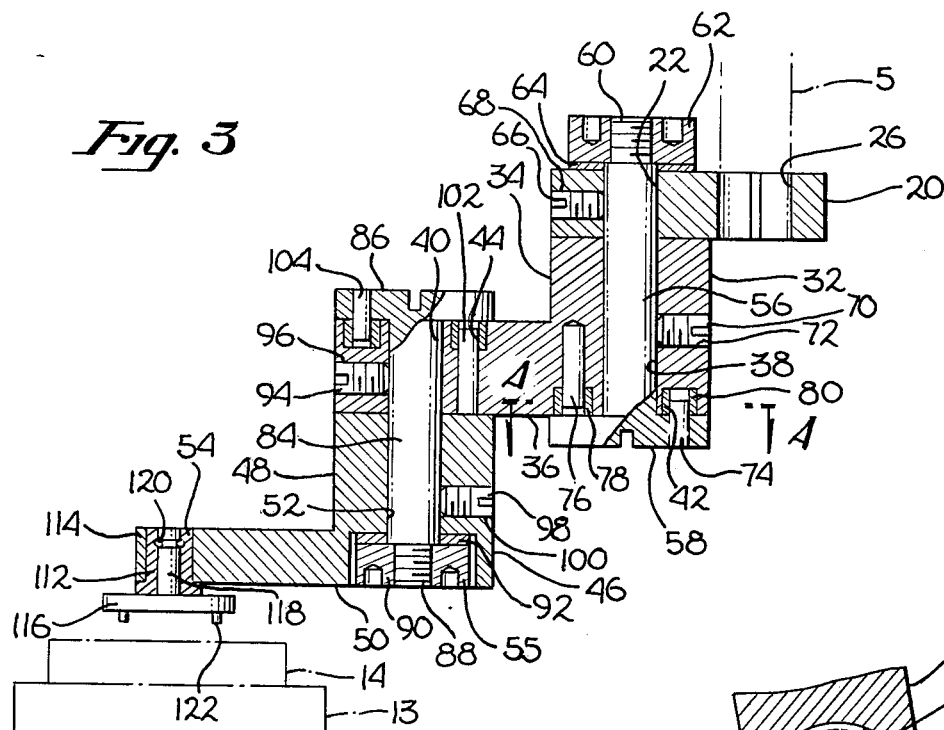
FIG. 3 is a cross-sectional view of the embodiment of FIG. 2 taken on the 3—3 line.
Figure 4:
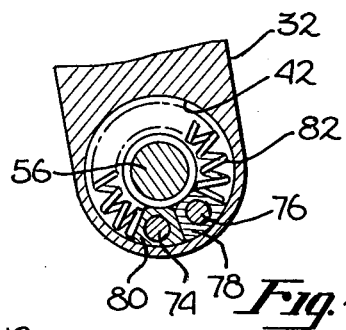
FIG. 4 is a cross-sectional view of the embodiment of FIG. 3 taken on the 4—4 line.

Referring to FIGS. 2, 3 and 4, therein contained is sufficient detail to set forth one embodiment of a work-holding apparatus 12 in accordance with the teachings of the present invention. Work-holding apparatus 12 includes a support base 20 having holes 22, 24 and 26 therein. Hole 26 in support base 20 is divided in half by a slit 28. Screw 30 in base 20 extends through slit 28.

First lever member 32 comprises a base 34 and an arm 36 extending radially from said base 34. Base 34 of first lever member 32 has a hole 38 bored therein concentric with the axis of base 34. Hole 40 is bored in the end of arm 36 of first lever member 32 and is in parallel with hole 38. Annular groove 42 is formed in the lower end of base 34 of first lever member 32 and is concentric with hole 38. Also, annular groove 44 is formed in the top surface of arm 36 of first lever member 32 and is concentric with hole 40.

Second lever member 46 comprises a base 48 and an arm 50 extending radially from the base 48. Hole 52 concentric with the axis of base 48 is bored in second lever member 46. Hole 54 is bored through the end of arm 50 of second lever member 46 and is in parallel with hole 52. Counter bore 55 is formed in the lower end of base 48 of second lever member 46 and is concentric with hole 52.

Base 34 of first lever member 32 is rotatably coupled to support base 20 by a shaft 56 inserted through holes 22 and 38. Shaft 56 further comprises a head 58 of sufficient diameter to close the annular groove 42 in the lower portion of base 34 and a threaded end 60 projecting from hole 22 in support base 20. Washer 64 is inserted onto the projected threaded end 60 and nut 62 is threaded onto end 60. Set screw 66 is threaded into threaded hole 68 of support base 20 for securing support base 22 and releasing it from shaft 56. Set screw 70 in base 34 of first lever member 32 is inserted into threaded hole 72 for securing first lever member 32 to and releasing it from shaft 56.

Pin 74 is fixed to base 34 of first lever member 32 and projects into annular groove 42. Pin 76 is fixed in the head 58 of shaft 56 and projects into annular groove 42. Spring seats 78 and 80 are releasably inserted respectively onto pins 74 and 76. Furthermore, seats 78 and 80 slidably fit within annular groove 38. Compression spring 82 is inserted into groove 38 and the two ends of spring 82 engage against seats 78 and 80.

Similarly to the previous description, first lever member 32 is rotatably coupled to second lever member by bolt 84. Bolt 84 comprises a head 86 which closes annular groove 44 in arm 36 of first lever member 32 and a threaded end 88 projecting into counter bore 55 in the lower end of base 48 of second lever member 46. Washer 92 is inserted onto the threaded end of bolt 84 and nut 90 is threaded thereon into counter bore 55. Nut 90 slidably fits within counter bore 55. Set screw 94 is inserted into threaded hole 96 in arm 36 of first lever member 32 for securing shaft 84 to and releasing it from first lever member 32. Set screw 98 is inserted into threaded hole 100 in arm 50 of second lever member 36 for securing shaft 84 to and releasing it from second lever member 46.

Pin 102 is fixed to first lever member 32 and projects partially into annular groove 44. pin 104 is fixed to the head 86 of bolt 84 and projects into annular groove 44. Spring seats 106 and 108 are respectively releasably inserted onto pins 102 and 104. Furthermore, spring seats 106 and 108 are slidably inserted into annular groove 44. Compression spring 110 is inserted into annular groove 44 and the two ends of spring 110 engage against spring seats 106 and 108.

Bearing bushing 112 is press-fitted into the bottom of hole 54 in arm 50 of second lever member 46. Resilient bushing 114 is inserted into the top of hole 54 in base 50. Shaft 118 coupled to pressure plate 116 is rotatably fitted into bushings 112 and 114. The ring 120 inserted between bushing 114 and shaft 118 controls the movement of pressure plate 116 in the vertical direction. Reference pins 122 are mounted on the lower surface of pressure plate 116.

Work-holding apparatus 12 is coupled to spindle head 1 by inserting shaft 5 into hole 26 and shaft 9 into hole 24 in support base 20. Tightening of set screws 30 and 31 fix support base 20 to the shafts 5 and 9.

In operation, first loosen set screws 67, 70, 94 and 98. Set the relative positions of support base 20, first lever member 32 and second lever member 46 as indicated by the solid line in FIG. 2 such that the reference pins 122 of pressure plate 116 coincide with the reference holes (not shown) in workpiece 14 when said workpiece 14 is in the predetermined starting position. After the relative positions have been set, tighten set screws 107 and 118.

When spindle head 1 descends together with rotating cutter 9, the reference pins 122 are inserted into the reference holes (not shown) of workpiece 14 so that pressure plate 116 engages workpiece 14 thereby securely fixing workpiece 14 onto jig plate 13. Cutter 9 engages workpiece 14 and cuts the latter to a depth required. Jig plate 13 then moves to the left to the position indicated by the dashed lines so as to cut a groove 124 in workpiece 14 (see FIG. 2). When jig plate 13 and the workpiece 14 mounted thereon move to the left, first lever member 32 and second lever member 46 rotate to the left and the space between spring seats 78 and 80 and 106 and 108 increases against the force of compression springs 82 and 110.

Upon completion of the cutting of groove 124, spindle head 1 is raised and cutter 9 is separated from workpiece 14. As spindle head 1 moves upward, pressure plate 116 separates from workpiece 14. When pressure plate 116 separates from the workpiece 14, the displacement force on work-holding apparatus 12 is removed. When the displacement force is removed, spring seats 78 and 80 and 106 and 108 are respectively forced back together by springs 82 and 110 previously held in compression. When spring seats 78 and 80 and 106 and 108 are forced back together, first and second lever members 32 and 46 return to the initially set position.

In the above description, first lever member 32 is energized in the clockwise direction and second lever member 46 is energized in the counter-clockwise direction. It should be apparent to one normally skilled in the art that first lever member 32 and second lever member 46 can be designed to be energized in either the clockwise or counter-clockwise direction.

As pointed out in the description of the embodiment above, the lever members may only move either in the clockwise or the counter-clockwise direction relative to each other but not both. In some applications it may be desirable for the lever members to be able to rotate relative to each other in both the clockwise and counter-clockwise direction. To achieve this end, the embodiment of FIG. 1 is modified as shown in FIGS. 5 through 9.

Referring to FIGS. 5 through 9, like elements have similar reference numerals and will not be described in detail in the following description.

Referring to FIGS. 6, 7, 8 and 9, therein contained is sufficient detail to set forth another embodiment of a work-holding apparatus 12 in accordance with the teachings of the present invention. Work-holding apparatus 12 includes a support base 202 having holes 204, 206 and 208 therein. Hole 208 in support base 202 is divided in half by slit 28. Screw 30 in base 202 extends through slit 28. Annular groove 210 is formed concentrically with hole 204.

First lever member 212 cmprises a base 214 and an arm 216 extending radially from said base 214. Base 214 of first lever member 212 has a hole 218 bored therein concentric with the axis of base 214. Hole 220 is bored in the end of arm 216 of first lever member 212 and is parallel with hole 218. Annular groove 222 is formed in the top surface of arm 216 of first lever member 212 and is concentric with hole 220. Counter bore 224 is formed in the lower end of base 214 of first lever member 212 and is concentric with hole 218.

Second lever member 226 comprises a base 228 and an arm 230 extending radially from the base 228. Hole 232 concentric with the axis of base 228 is bored in second lever member 226. hole 234 is bored through the end of arm 50 of second lever member 226 and is in parallel with hole 232. Counter bore 236 is formed in the lower end of base 228 of second lever member 226 and is concentric with hole 232. Annular groove 238 is formed in the top surface of arm 230 of second lever member 226. First lever member 212 is rotatably coupled to support base 202 by the combination of a bolt 240, ring 242 and nut 244.

Ring 242 has a hole 246 bored through the central portion and an annular groove 248 formed in the upper portion of the ring 242. Bolt 240 having a head 250 which covers the annular groove 248 in ring 242 is inserted through the hole 246 in annular groove 242, the hole 204 in support base 202, and hole 218 in first lever member 226. Threaded end 252 of bolt 242 projects into counter bore 224 in the lower portion of base 214. Washer 254 is placed on threaded end 252 and nut 244 is threaded thereon. Pin 256 fixed in support base 202 projects into annular groove 210. Pin 258 fixed in the lower portion of ring 242 projects into annular groove 210. Pin 260 fixed in the upper portion of ring 242 extends into annular groove 248 in ring 242 and pin 262 projecting from the lower portion of head 250 of bolt 240 projects into annular groove 248. Spring seats 264, 266, 268 and 270 are inserted slidably and unrotatably into annular grooves 210 and 248 respectively. Furthermore, spring seats 264, 266, 268 and 270 are respectively rotatably inserted onto pins 256, 258, 260 and 262. Compression spring 272 is inserted into annular groove 210 and the two ends of spring 272 engage against seats 264 and 266. Similarly, spring 274 is inserted into annular groove 248 and the ends of spring 274 engage with spring seats 268 and 270.

Second lever member 226 is rotatably coupled to first lever member 212 in a similar fashion as first lever member 212 is rotatably coupled to support base 202 as previously described. Also, in a similar manner, pressure plate 276 is rotatably coupled to the end of second lever member 226, but with the following described differences. Shaft 278 is rotatably inserted through hole 246 in second lever member 226 and hole 246 in ring 242. Shaft 278 has a flange 280 and a narrow portion 282 projecting from hole 246 in ring 242. Collar 284 is inserted onto narrow portion 282 of shaft 278. Screw 290 in shaft 278 together with washer 292 prevent shaft 278 from moving in a vertical direction. Also, screw 286 in collar 284 prevents shaft 278 from rotating relative to collar 284. Screw 288 couples pressure plate 276 to shaft 278. Pin 294 is fixed in collar 284 and projects into annular groove 248 in ring 242. Spring seat 296 is rotatably inserted onto pin 294 and is slidably and unrotatably mounted in annular groove 248. Reference pins 298 are fixed to the bottom surface of pressure plate 276. Set screw 300 in base 214 of first lever member 212 secures first lever member 212 to bolt 240. Set screw 302 in base 228 of second lever member 226 secures second lever member 226 to bolt 240.

For the purposes of illustration only and to simplify the following description, the following detailed description of the preferred embodiment is limited to a single rotatable coupling between support base 202 and first lever member 212. In operation, first loosen set screw 300 and set the position of first lever member 212 relative to base 202 to a preselected position and tighten set screw 300. If first lever member 212 rotates clockwise due to an external force, pins 256 and 258 do not move relative to each other. Also, ring 242 and pin 260 do not rotate. As first lever member 212 rotates clockwise about bolt 240, pin 262 rotates clockwise and spring seat 270 on pin 262 engages against spring 274. A seat 270 rotates clockwise, the space between spring seat 268 and 270 increases and spring 274 is compressed. When the external force on first lever member 212 is removed, spring 274 forces spring seats 268 and 270 together thereby rotating first lever member 212 in the counter-clockwise direction and restoring first lever member 212 to its preset initial position. Similarly, if first lever member 212 rotates counter-clockwise about bolt 240 from the present initial position as a result of the application of an external force, bolt 240 and ring 242 rotate in the counter-clockwise direction. As ring 242 rotates counter-clockwise, pin 258 together with spring seat 264 rotate counter-clockwise thereby engaging against compression spring 272. As spring seat 264 rotates counter-clockwise the space between spring seat 264 and 266 increases and spring 272 is compressed within annular groove 210. When the external force is taken away, spring 274 under compression forces seats 264 and 266 together thereby causing first lever member 212 to rotate clockwise and to return to the initial preselected position. In a similar fashion, the rotatable couplings between first lever member 212 and second lever member 226 and pressure plate 276 and second lever member 226 operate in the same manner as previously described.

Figure 6:
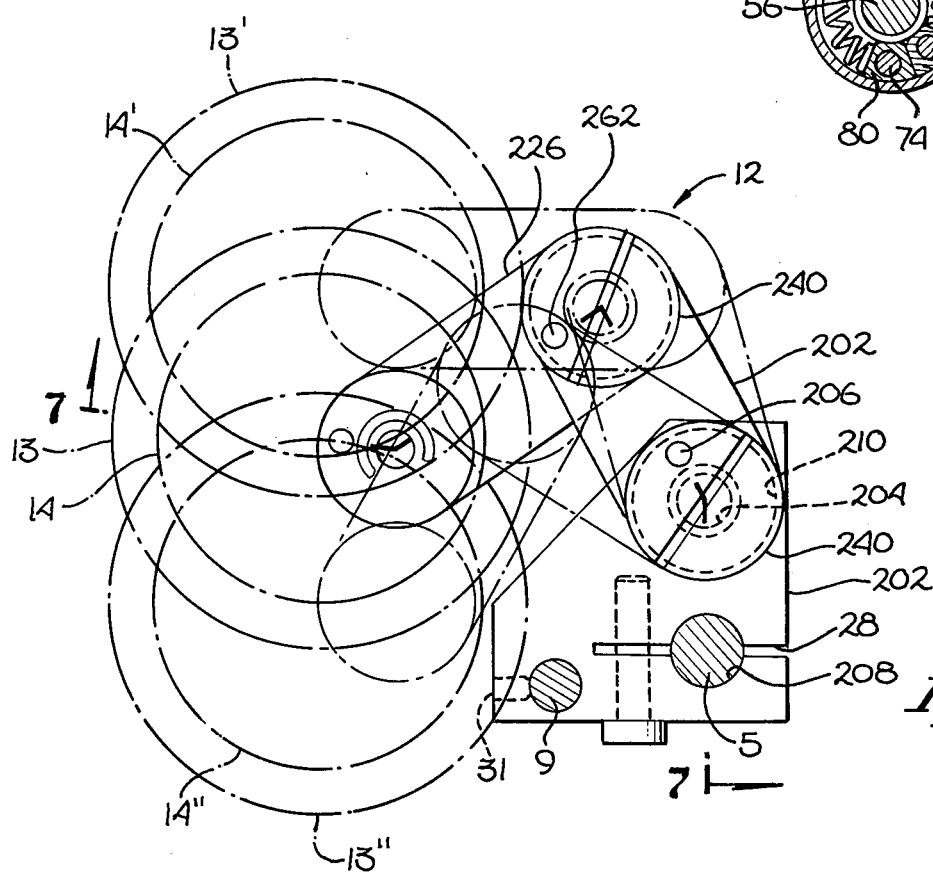
FIG. 6 is a plan view of the embodiment of FIG. 5 looking in the direction of the 6—6 line.
Figure 5:
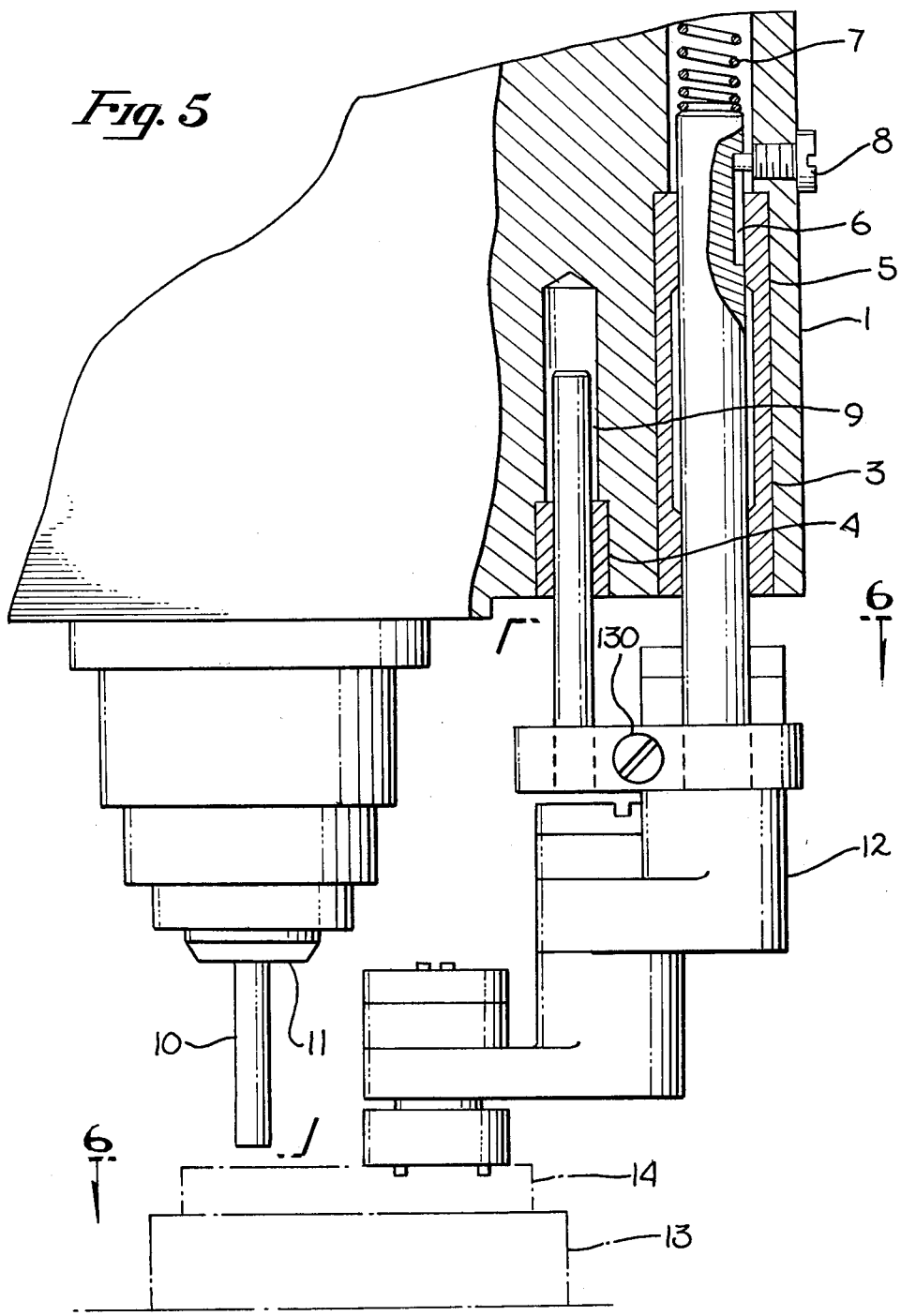
FIG. 5 is a side view of a second embodiment of a work-holding apparatus in accordance with the teaching of the present invention.
Figure 7:
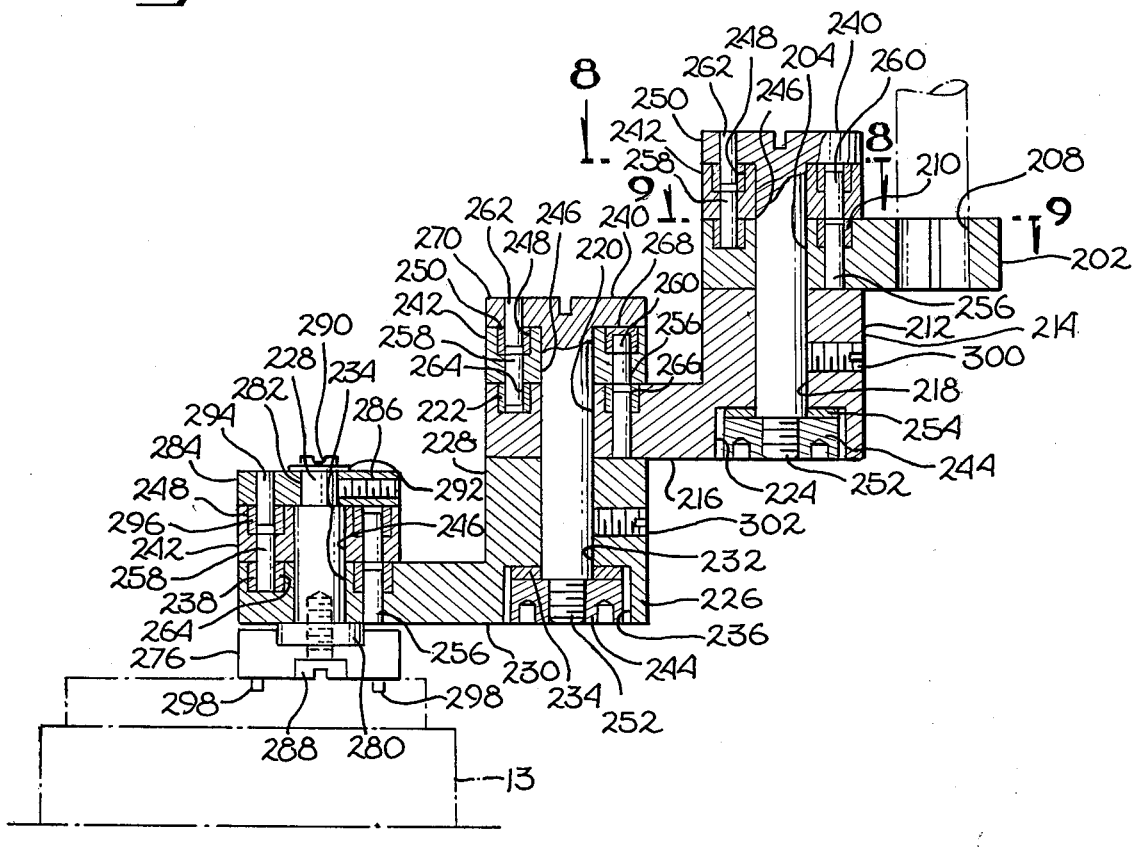
FIG. 7 is a cross-sectional view of the embodiment of FIG. 6 taken along the 7—7 line.
Figure 8:
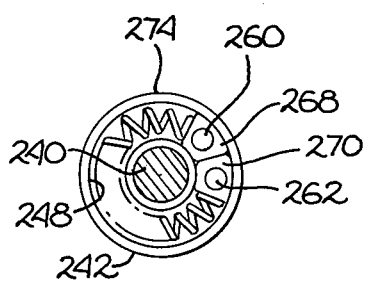
FIG. 8 is a cross-sectional view of the embodiment of FIG. 7 taken along the 8—8 line.
Figure 9:
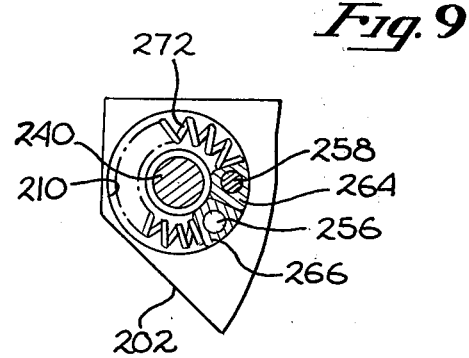
FIG. 9 is a cross-sectional view of the embodiment of FIG. 7 taken along the 9—9 line.

Referring to FIG. 6, therein is shown a plan view of the previously described embodiment. As shown in FIG. 6, work-holding apparatus 12 can rotate in a clockwise direction as indicated by the dashed lines and jig plate 13' and workpiece 14'. Also as indicated by the dashed lines and jig plate 13" and workpiece 14", the work-holding apparatus 12 can rotate in the counter-clockwise direction.

As described above, the embodiments of the work-holding apparatus according to this invention are capable of smoothly following varied modes of jig plate travel and of returning to the starting position after the work on the workpiece has been performed. Furthermore, since the restoration mechanism is housed within each shaft support, it is protected from foreign material or the like and its reliability is increased.

In all cases it is understood that the above-described embodiments are merely illustrative of but a small number of the many possible specific embodiments which can represent applications of the principles of the present invention. Numerous and varied other arrangements can be readily devised in accordance with these principles by those skilled in the art without departing from the scope of this invention.

I claim:

1. A work-holding apparatus for press holding from above a workpiece placed on a jig while following horizontal movement of said work, which comprises:

a chain mechanism comprising lever members having ends each rotatably coupled together by shaft supports perpendicular to the work moving surface;

an ascendable guide member biased downwardly by a spring means, said guide member being coupled to one end of said chain mechanism by means of another rotatable shaft support in parallel with said other shaft supports;

a means housed in said shaft supports for setting initial relative positions between the members and for restoring said members to said initial relative positions when said members are displaced from said initial positions by an external force.

2. The work-holding apparatus according to claim 1 wherein said shaft support comprises a center shaft rotatably coupling two members together and a means for coupling said center shaft to said members such that the relative rotational positions of the members may be set.

3. The work-holding apparatus according to claim 2 wherein said shaft support comprises:
    an annular groove formed concentric with said center shaft in at least one member;
    a first and second pins fixed to said members respectively and projecting into said annular groove; and
    a compression spring inserted into said annular groove, the ends of said spring engaging with said pins.

4. The work-holding apparatus according to claim 3, further comprising a seat coupled to at least one of said first or second pins, said seat being inserted into said annular groove.

5. The work-holding apparatus according to claim 2, further comprising:
    a ring concentrically and rotatably mounted around said center shaft of said shaft support and forming pairs of rotating surfaces with said center shaft and said member;
    a first annular groove formed in at least one rotating surface of one pair of rotating surfaces, and concentric with said center shaft;
    a second annular groove formed concentric with said shaft member in at least one rotating surface of the other pair of rotating surfaces;
    a first pin fixed to said shaft and projecting into said first annular groove;
    a second pin fixed in said ring and projecting into said first annular groove;
    a third pin fixed in said ring and projecting into said second annular groove;
    a fourth pin fixed in said member and projecting into said second annular groove;
    compression springs inserted into said first and second annular grooves thereby allowing said members to be rotated in either direction from said initial positions when an external force is applied and restoring said members to said initial positions when said external force is removed.

6. The work-holding apparatus according to claim 5, further comprising a seat coupled to at least one of said first or second pins and inserted into said first annular groove and a seat coupled to at least one of said third or fourth pins and inserted into said second annular groove.

* * * * *